(12) United States Patent
Argaman

(10) Patent No.: US 11,440,216 B2
(45) Date of Patent: Sep. 13, 2022

(54) SYSTEM AND METHOD FOR MANUFACTURING MULTILAYER CLADDINGS WITH A DECORATIVE LAYER

(71) Applicant: ACKERSTEIN INDUSTRIES LTD., Herzlia (IL)

(72) Inventor: Gideon Argaman, Hadera (IL)

(73) Assignee: ACKERSTEIN INDUSTRIES LTD., Herzlia (IL)

( * ) Notice: Subject to any disclaimer, the term of this patent is extended or adjusted under 35 U.S.C. 154(b) by 0 days.

(21) Appl. No.: 17/465,239

(22) Filed: Sep. 2, 2021

(65) Prior Publication Data
US 2022/0063130 A1 Mar. 3, 2022

(30) Foreign Application Priority Data
Sep. 3, 2020 (IL) .......................................... 277115

(51) Int. Cl.
*B28B 19/00* (2006.01)
*B28B 17/00* (2006.01)
*B65G 43/10* (2006.01)
*B65G 47/78* (2006.01)

(52) U.S. Cl.
CPC ...... *B28B 19/0053* (2013.01); *B28B 17/0081* (2013.01); *B65G 43/10* (2013.01); *B65G 47/78* (2013.01); *B65G 2201/042* (2013.01)

(58) Field of Classification Search
CPC ... B28B 1/0873; B28B 13/022; B28B 13/023; B28B 13/0245; B28B 17/0081; B28B 19/0007; B28B 19/0053; B28B 23/0075; B28C 5/34; B28C 5/36; B28C 5/365;
(Continued)

(56) References Cited

U.S. PATENT DOCUMENTS 3,499,069 A * 3/1970 Denton ..................... B28B 3/02
264/234
4,395,180 A * 7/1983 Magnotte .................. B66C 7/14
104/127
(Continued)

FOREIGN PATENT DOCUMENTS

DE  102008050955 A1  4/2010

OTHER PUBLICATIONS (Translated) Decision to grant a patent by Israeli Patent Office for Israel Patent Application No. IL 277115, dated Dec. 15, 2020.

*Primary Examiner* — Gene O Crawford
*Assistant Examiner* — Keith R Campbell
(74) *Attorney, Agent, or Firm* — The Roy Gross Law Firm, LLC; Roy Gross

(57) ABSTRACT

The invention is a machine for producing decorative aggregate G-layer on top surfaces of claddings in cooperation with a cladding manufacturing machine. The G-layer production machine may be integrated into the cladding manufacturing machine or a standalone machine. In both options, the machines synchronize the overlaying of the top G-layer with the manufacturing process of the claddings to ensure continuous production of multi-layer claddings with a decorative aggregate layer. The overlaying itself is done under controlled condition to produce homogenous distribution of the aggregates on the top surface of the claddings to provide them an aesthetic look.

19 Claims, 15 Drawing Sheets

(58) Field of Classification Search
CPC ........ B65G 33/14; B65G 43/10; B65G 47/78;
B65G 2201/042
See application file for complete search history.

(56) References Cited

U.S. PATENT DOCUMENTS

| | | | |
|---|---|---|---|
| 6,382,947 B1 * | 5/2002 | Bryant | .................. B28B 13/023 |
| | | | 425/258 |
| 6,616,874 B1 * | 9/2003 | Lazar | .................. C04B 40/0071 |
| | | | 425/258 |
| 8,800,245 B1 | 8/2014 | Pien | |
| 2003/0227814 A1 | 12/2003 | Priesnitz et al. | |
| 2006/0260255 A1 | 11/2006 | Ganpule | |
| 2009/0311356 A1 * | 12/2009 | Belt | ...................... B28B 13/025 |
| | | | 425/120 |
| 2010/0239816 A1 | 9/2010 | Kinkade | |
| 2019/0338533 A1 | 11/2019 | Palladino | |

* cited by examiner

SYSTEM AND METHOD FOR MANUFACTURING MULTILAYER CLADDINGS WITH A DECORATIVE LAYER

CROSS REFERENCE TO RELATED APPLICATIONS

This application claims the benefit of priority of Israel Patent Application No. 277115, filed Sep. 3, 2020, the contents of which are all incorporated herein by reference in their entirety.

TECHNICAL FIELD

The present invention pertains to multi-layer cladding, paving stones, concrete pavers, concrete stones and concrete claddings. More particularly, the present invention pertains to machine and method for manufacturing multi-layer industrial claddings, pavers and stones with a decorative top layer.

BACKGROUND

Machines and methods for manufacturing multi-layer cladding and method are known and well-established in the building industry. A particular machine for manufacturing tiles or bricks in a vibration mode with a "half-dry" concrete with a standard machine is in use in many plants and produced by many companies worldwide. The production of the cladding, brick or tile, paving stone, and any other concrete product is made in one or two layers. This manufacturing machine includes two concrete hoppers, one for a "base" layer and a second for a "top" layer. The bottom of every hopper has a gate that opens to a "filling basket" below. At the center of the machine stands is a vibration work table, which is designed to condense the concrete inside the template. Above the vibration table stands a "production board", which can be made of wood, synthetic material or metal. The template lowers onto the plate with a desired pattern of a tile or brick, where the shape of the tile, brick or cladding is obtained by partitions within the template which is hollow. Above the template stands a "tamper head" with plates in the size of the tiles, bricks or claddings in proper position relative to the template.

In the production process, the plant receives the raw materials from quarries and mines. The raw materials are essentially different types of aggregates (e.g. ground dolomite), pebbles and different types of sand. In addition, cement, pigments and different additives are added to the mixture for producing the bulk and imparting it features such as color and shade. The raw materials are stored in silos (large containers) according to their types. A sorting and weighting system produces the different types of the concrete automatically under computer control, where after weighting, the concrete batch is transported to a mixer that mixes it with cement, water, additives, if needed, and pigments, if desired.

A "base", namely a bottom layer, concrete batch is transferred to a concrete hopper of the machine, which is intended for the "base" layer. The "upper", namely top layer, concrete batch is transferred to the concrete hopper, which is intended for the top layer. A gate below the base hopper opens and a concrete quota is released to a filling basket for the bottom layer. The basket travels along above the template and the concrete for the basket that does not have a base fills the template. The work table is vibrated to condense the concrete in the template. Then the bottom layer basket returns to its starting point. A filling basket for the top layer, which is filled with a concrete quota from the top layer hopper, travels along above the template and fills it with concrete in the remaining space in the template. Then the basket returns to its starting point. A tamper head lowers down on the template and closes the openings. Then the head is pushed into the template while the table vibrates and prevents the concrete from splashing up. In the end of the vibration, the template moves up and above the level of the products. The products remain on the production board. The board moves forward on a conveyor and then for curing. The next production board enters above the vibration table and the process is carried out as detailed above. After curing in the cells, the production boards return with the cured products to the packaging system that takes the claddings, paving stones, concrete pavers, concrete stones and concrete claddings off of the board and packs them.

A similar process is done for single layer claddings and only with a single type of concrete for filling the template (e.g., base concrete). In such version, the concrete mixture is adapted to this single layer cladding. For colored claddings, the top layer contains a pigment, which is mixed together with all other materials to form the top concrete layer. Then the top layer is obtained with a selected shade. There are different claddings with "cocktail" shades (color mix), when different mixtures are introduced into the top layer concrete in the production process. Also there are different single layer claddings with a cocktail shade. For claddings with exposed aggregates at the outer decorative surface, aggregates in different sizes, e.g. 1-10 mm, and different colors, e.g., black, grey, red, are used.

Exposing of the claddings surface is done in different methods such as those mentioned in the following:
1) Washing the cladding surface with water immediately after production. This method provides a medium exposure of the surface.
2) Transferring the cladding to Shot Blast or Sand Blast systems after curing in the production process. Here the aggregate surface, which is covered with a thin layer of cement, sand and pigment, is exposed. The exposure in this method is medium-well.
3) Transferring the cladding through a grinding process after curing. Here the cladding, paving stones, concrete pavers, concrete stones and concrete claddings surface is exposed by taking off a thin layer of about 1-4 mm or cutting and the aggregates close to the cladding surface are exposed with their different shades. The exposure in this method is good but the method itself is expensive.

It is, therefore, an object of the present invention to provide a method for manufacturing a multi-layer cladding, paving stones, concrete pavers, concrete stones and concrete claddings with a decorative layer that overcomes the relatively complicated multi-stage before curing of the decorative layer on the one hand and the high costs on the other hand.

It is yet another object of the present invention to provide a method for manufacturing a multi-layer cladding, paving stones, concrete pavers, concrete stones and concrete claddings with a decorative layer that is integrated into traditional methods of manufacturing claddings and all other types mentioned above.

It is yet another object of the present invention to provide a multi-layer cladding, paving stones, concrete pavers, concrete stones and concrete claddings with a decorative layer with optimal exposure of the decorative layer. Particularly, the surface of the aggregates in the decorative layer is free of coating or residues of materials in the mixture of the cladding and all other types mentioned above. It is yet another object of the present invention to provide multi-layer cladding, paving stones, concrete pavers, concrete stones and concrete claddings with a decorative layer with different even distribution of aggregates of the decorative layer over the cladding and a selected shade or mixtures of shades.

This and other objects and embodiments of the present invention shall become apparent as the description proceeds.

SUMMARY

In one aspect, the present invention provides a multi-layer cladding, paving stones, concrete pavers, concrete stones and concrete claddings manufacturing system for producing such types of stones with exposed aggregate layer on its outer surface and a decorative look without any additional post-production processes. In the following, the term "cladding" will be used as a generic name for all the types of products which may be manufactured by the system and method of the present invention and as listed above.

In one particular embodiment, this manufacturing system is integrated into a cladding manufacturing machine and the routine manufacturing process of the claddings. Therefore, in one embodiment, the system comprises the following parts:

1. A trough for even/homogenous distribution of the aggregate mixture, which is exposed on the outer surface of the cladding. The trough contains the aggregates along the width of a template for manufacturing the cladding and can thus distribute the aggregate mixture, also termed herewith the "G mixture", evenly or randomly on the cladding surface. The aggregates are mixed with a mixture of additional materials particularly dedicated for the manufacturing of the decorative cladding. The trough is attached to the basket of the top layer cement. The trough's opening is closed, when the filling basket travels ahead to fill the top space of the template. When the basket of the top layer returns, the trough opens immediately in the beginning of the movement of the basket. The trough's bottom opening opens in the desired width. Then the aggregate mixture is released and distributed over the entire surface of the template as the basket returns to its starting point. The trough's opening closes as the basket reaches its starting point and/or all of the aggregate mixture is dispensed. The manufacturing process continues in the standard way, as described above (lowering of the tamper head etc.).

2. A storage and feeding hopper for the G mixture—The G mixture hopper is fixedly attached to the hopper of the concrete of the top layer and is not movable. In particular embodiments, the hopper of the G mixture may be cylindrical or box-shaped and stretch along the width of the template.

In one particular embodiment, the G mixture hopper comprises a filling and distribution system to fill the trough with a measured amount of the mixture in a short period of time, e.g. 5-10 seconds. Further, the filling and distribution system comprises a snail or gate valve or a special conveyor for conveying the mixture from the hopper to the trough.

3. A system for traveling the G mixture to the hopper—This system comprises an elastic or rigid snail conveyor, which is made of single unit or two units at an angle one relative to the other. The G mixture is then manually or mechanically introduced into a funnel at the proximal end of the system, and the mixture travels to the hopper of the G mixture.

4. A system for preparing the G mixture—This system is constructed of several storage containers, in which the components of the G mixture are stored, a weighting system that weighs the components to obtain the desired amounts and mixture and a mixer.

5. A control system to control the entire process for preparing and distributing the G mixture over the outer surface of the cladding.

A three-layer cladding—

The manufacturing process described above produces a cladding which is mechanically equal to a standard machine-produced stone. The G aggregate layer is integrated with and bonds to the most top part of the top layer of the cladding. The method of distributing the G mixture allows spatial uniformity of the exposed aggregates over the entire surface of the template, namely over the surface of the cladding. The composition of the special G mixture is such that no cover layer is formed on the aggregates, which allows it to integrate with the top layer of the cladding. The wetness of the top layer bonds the components of the G mixture and creates an integral and strong texture.

Example of Making a G Mixture

To obtain a visual white hue aggregate, the G mixture is composed as follows:
white quartz;
ground aggregate quarts;
white cement;
of water;
an addition of a pigment that is provided according to the desired hue.

Similarly, to obtain red or black aggregates, proper shades are used for the same composition.

To obtain a look of two shades of aggregates, two G mixtures are prepared with the right shades and mixed before feeding to the cladding manufacturing machine.

Trough: The bottom of the trough comprises a gate or opening that can be controllably opened and closed. The opening, which aperture may be set according to the amount of mixture to be released at any given time interval, corresponds to the flow of the G mixture and total amount to be distributed.

The trough may also comprise vibrators on it that can be controlled by the control system and by changing the vibrator power we can control the flows of the G material. The vibrators may be electrical or pneumatic.

The speed of the filling basket in front of the opening of the trough—

The velocity of the filling basket that moves the trough can be controlled and changed, particularly to fit the area that the aggregate mixture should cover and the required even or random or any type of distribution of the mixture on the top surface of the cladding.

It is possible to position the trough's opening to stretch along the length of the trough, namely along the width of the template. It is also possible to change the intensity and frequency of vibration of the vibrators on the trough to meet desired distribution and thickness of the G mixture on the top surface of the claddings. The control system which is computerized, and the software operating it, controls all the movements, speeds, openings, vibration so it allows any kind of distribution on top of the stones, and create changes between the products coming out of the machines means: for example, board no. 1 gets one kind of distribution, board No. 2 get second kind of distribution, etc.

In what follows and in accordance with the previous paragraphs, a detailed description of preferred non-limiting embodiments of the invention is disclosed for the product, method, machinery and elements for manufacturing the cladding blocks with a decorative aggregate layer without departing from the scope and spirit of the invention.

DETAILED DESCRIPTION OF THE DRAWINGS

Figure 1A:
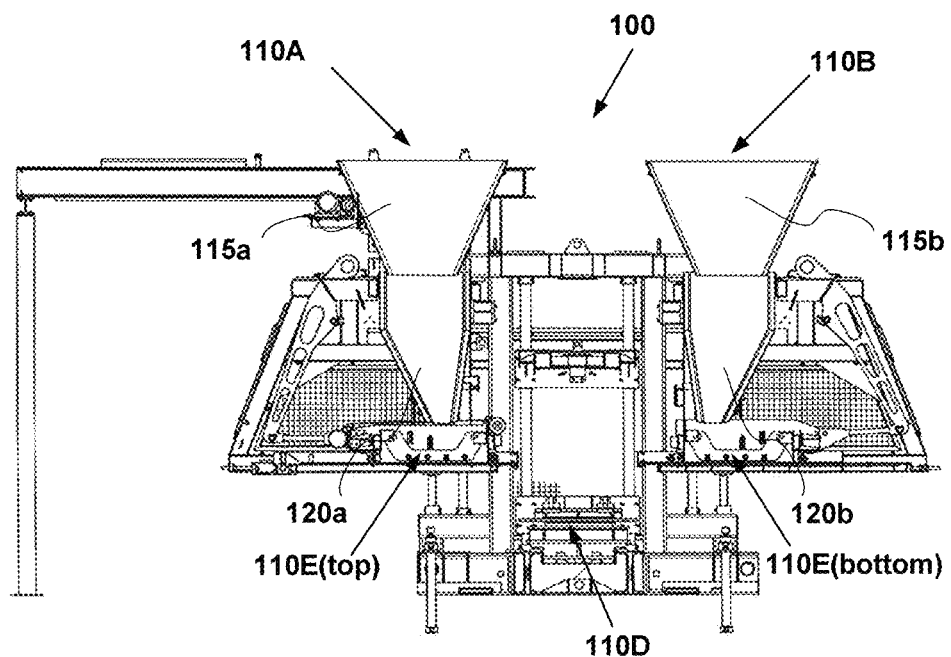
FIGS. 1A-D illustrate a machine for manufacturing cladding elements that is paired with a standalone version of a machine for producing an aggregate decorative G layer.
Figure 10A:
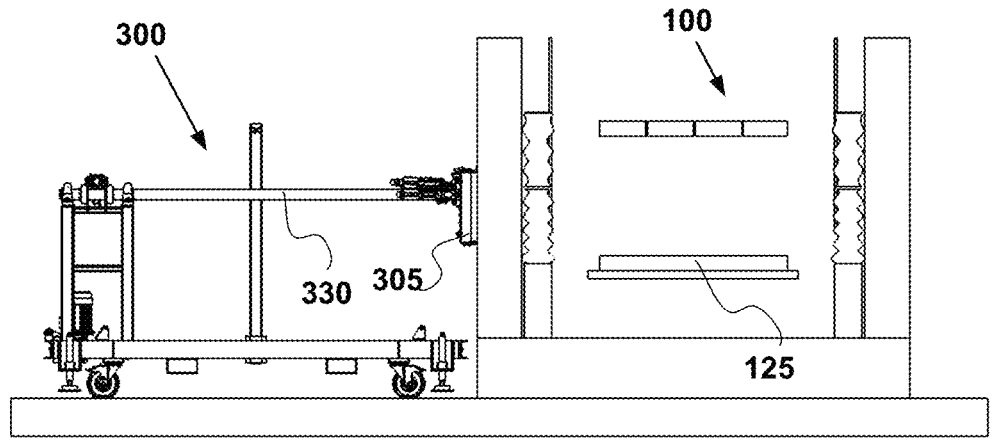
FIGS. 10A-C illustrate the co-operation of the machine for manufacturing the claddings and the standalone machine for producing the decorative G layer on the claddings.
Figure 10B:
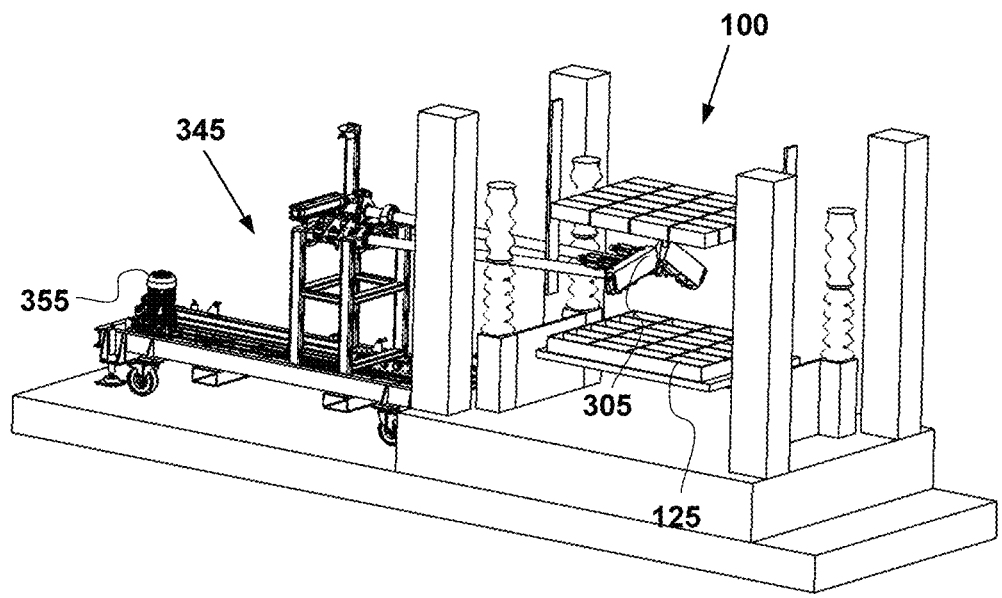
Figure 10C:
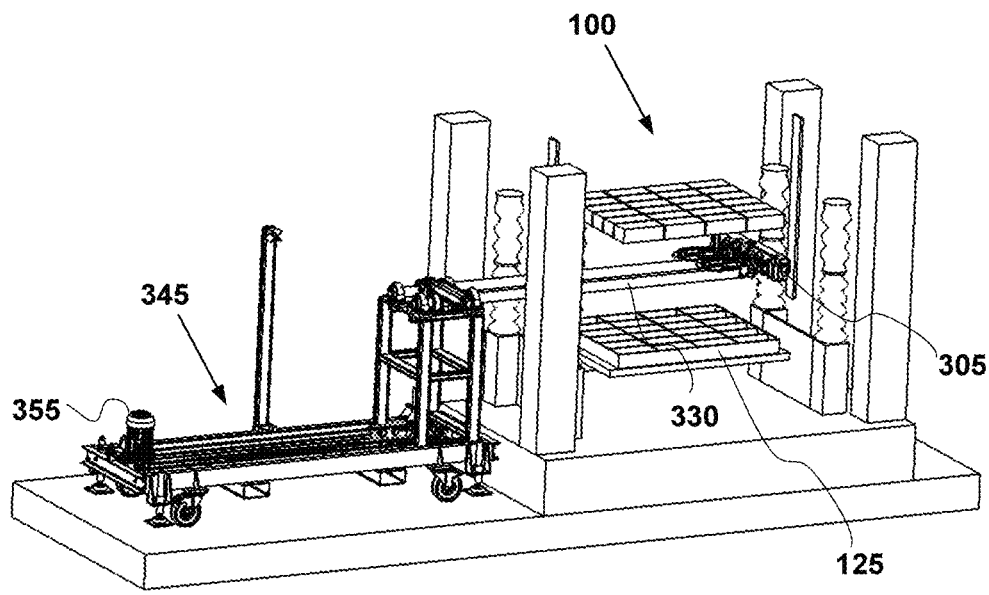

FIG. 1A illustrates one type of a machine 100 for manufacturing claddings with one or more layers. The machine 100 comprises two hoppers 110A, 110B, which are filled with concrete. The concrete in one hopper, e.g. 110B is used for the base layer, and the concrete in the second hopper, 110A, is used for the top layer of the cladding. Each one of these two hoppers comprises an upper funnel 115a, 115b, and a lower basket 120a, 120b, respectively. The upper funnels are filled with the concrete for the corresponding upper and lower layers of the cladding. A gate between the funnel and basket opens and discharges a prescribed quota to the basket for filling the cladding template with base or upper layer concrete. The cladding template is placed on a board, which is placed on the vibrating table 110D, and the concrete is discharged from the basket into the template. The basket returns to its initial place for another cycle of refilling and discharging. Then the gate opens between the funnel and basket of the concrete for the upper or top layer concrete for the upper layer. After the top layer concrete basket is filled with a selected quota, it travels to a point above the template and discharges the concrete into the template. It then travels back for the next cycle. A vibrator in the vibrating table 110D, vibrates the work table to condense the concrete of the base and top layer after filling the template with the concrete of that layer. A tamper head lowers down on the template and closes it. The template moves up and returns to the work table, leaving the concrete claddings on the board for curing. As illustrated in FIGS. 10A-C, the present invention introduces another step in this manufacturing process to produce a decorative aggregate G layer on the top layer of the claddings, while using the advantage of the claddings in their pre-formed state. Thus the aggregates of the G layer are partially impregnated in the concrete top layer and partially left exposed in their upper surface. Such a result is advantageous in creating a relatively ordered, not random, formation of the aggregates of the G layer over the top layer without the need for a second process to expose the aggregates, such as shot or sand blasting to expose their upper surface after curing of the product.

Figure 1B:
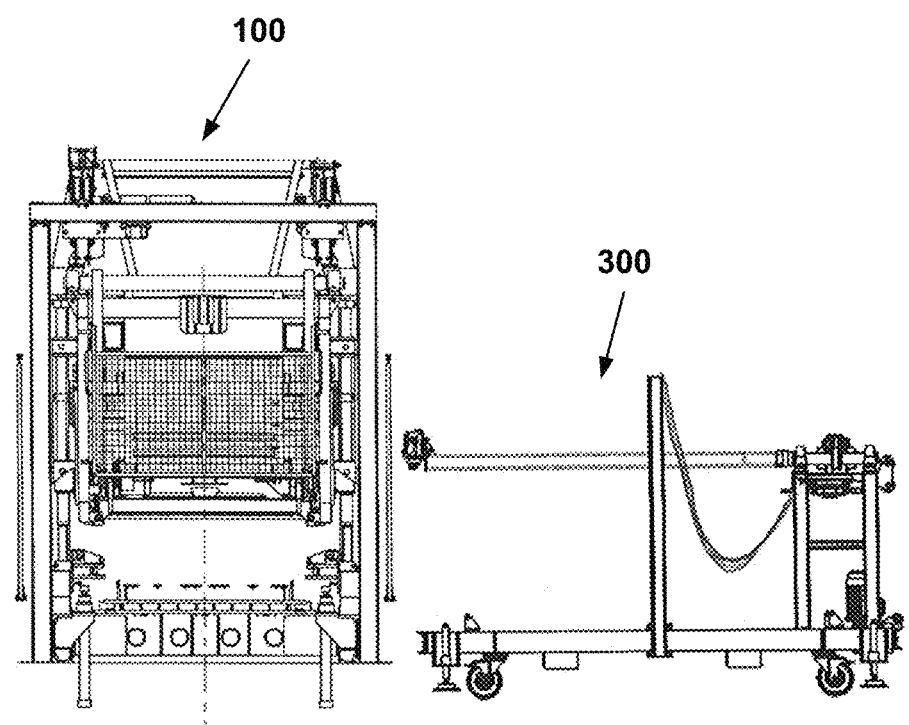
Figure 1D:
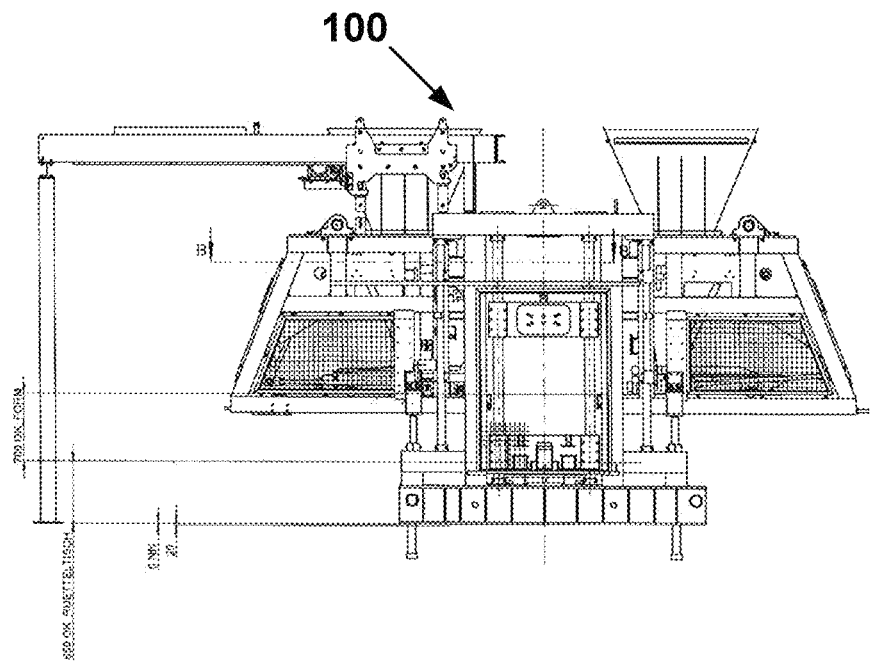
Figure 1C:
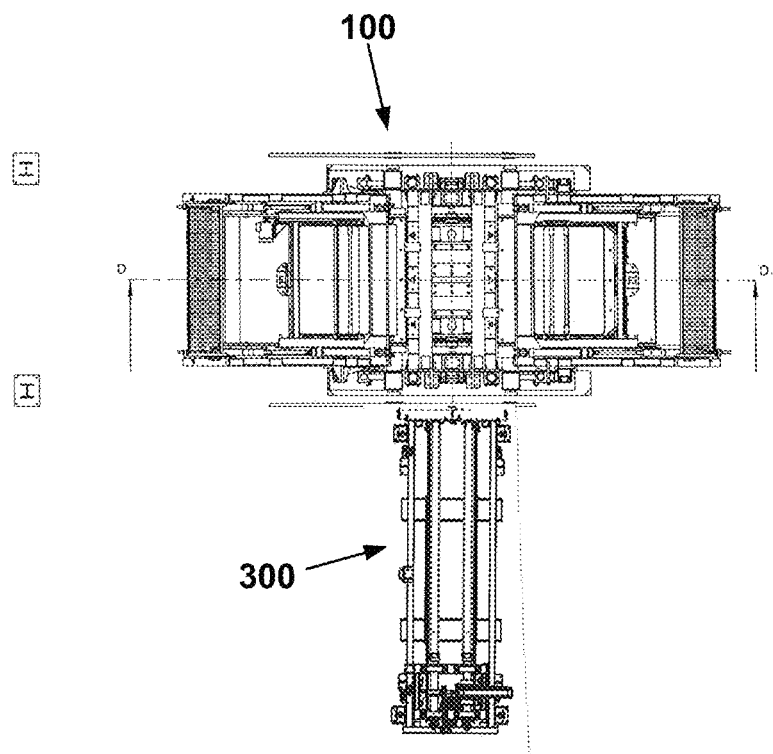

FIGS. 1A and 1D show that the machine 100 is held fixed in place with a. FIGS. 1B and 1C illustrate the coordination between the cladding manufacturing machine 100 and the G layer overlaying standalone machine 300. Machine 300 is positioned horizontally relative to the cladding manufacturing machine 100 and parallel to the work table of machine 100, where the work table is positioned between the two hoppers 110B and 110A for delivering the concrete for the base and top layers. As mentioned above, FIGS. 10A-C illustrate the coordinated introduction of machine 300 into machine 100 continuously with the workflow of the manufacturing of the concrete claddings.

Figure 2:
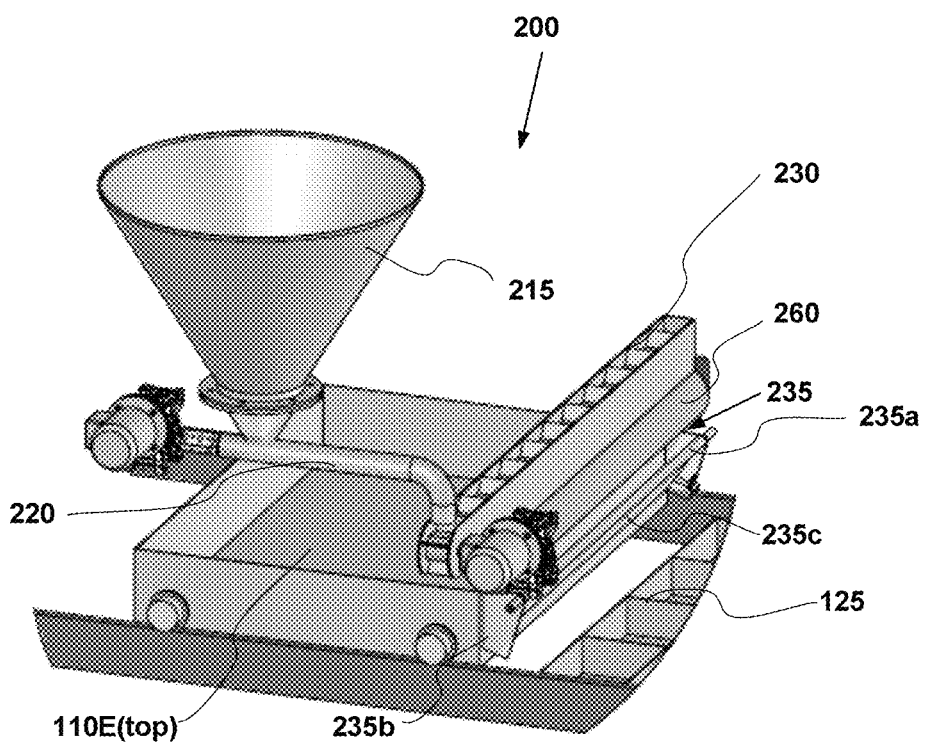
FIGS. 2-7 illustrate an integrated version of the machine for producing an aggregate decorative G layer on cladding elements which are manufactured in the machine illustrated in FIG. 1.
Figure 3:
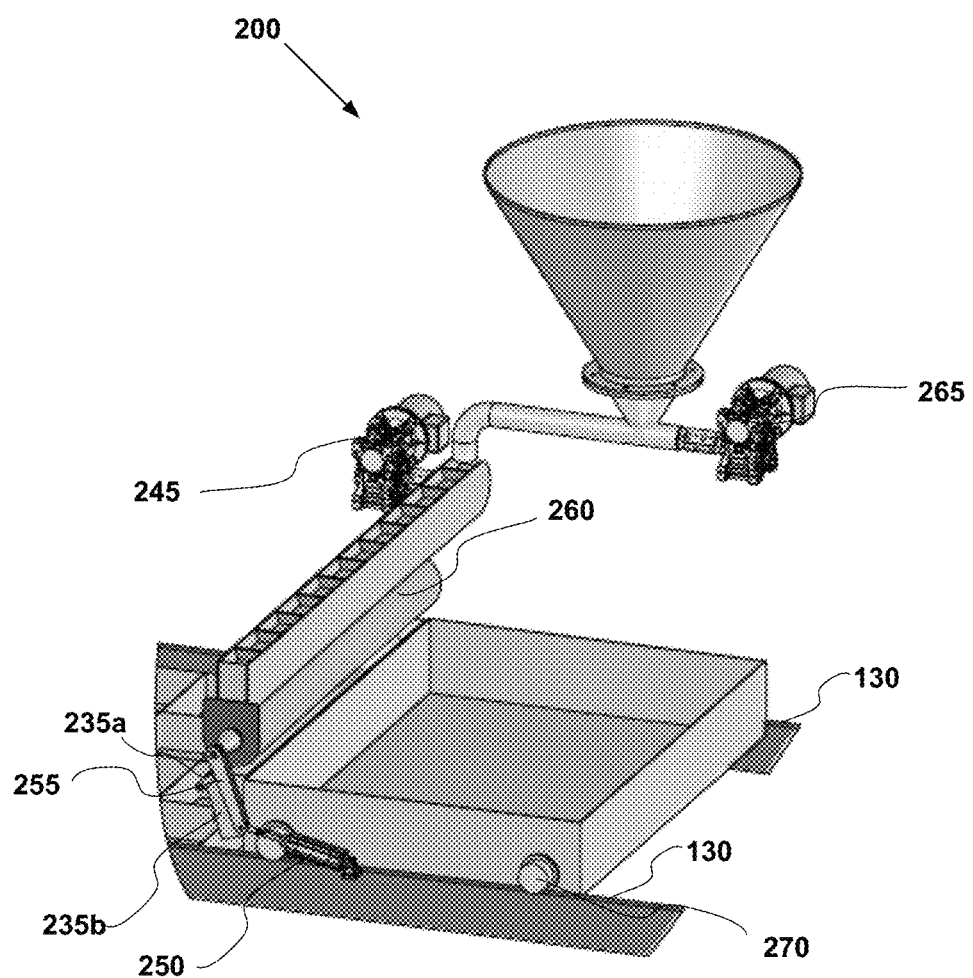
Figure 4:
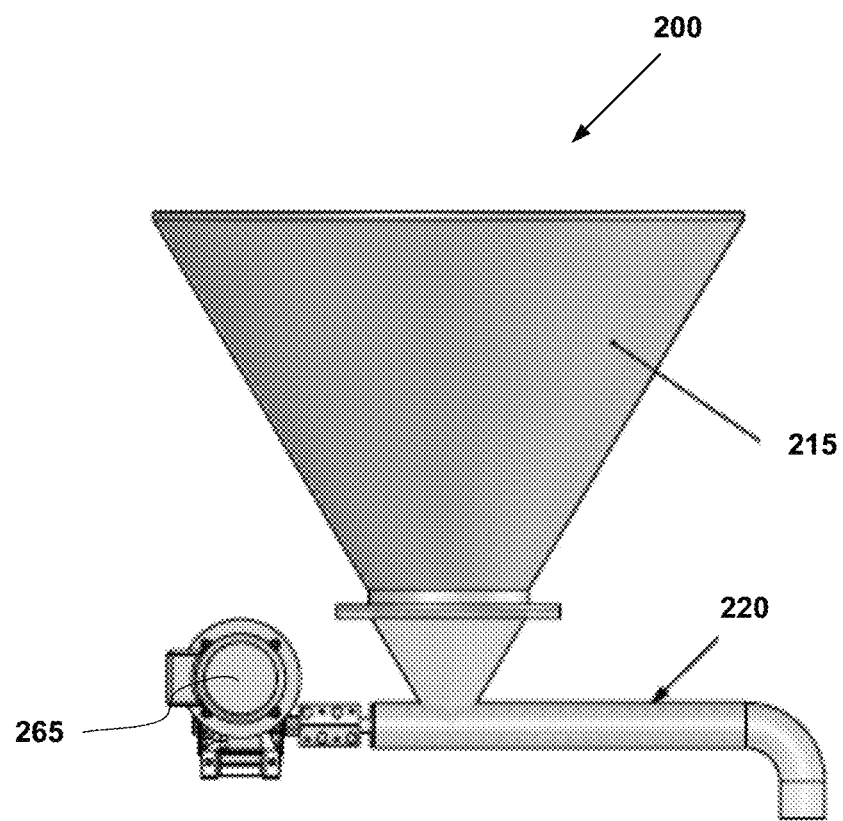
Figure 5:
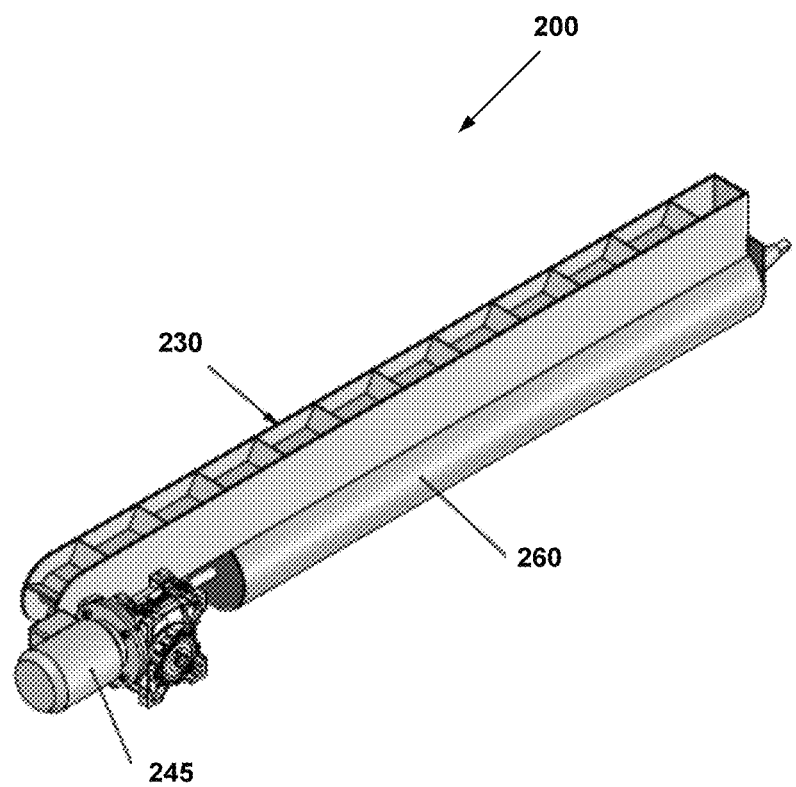

FIGS. 2-7 illustrate the integrated version 200 of the G layer production machine. Essentially, machine 200 is fixed inside the cladding manufacturing machine 100, and specifically attached to the second basket that contains and discharges the concrete of the top layer. As the second basket retreats at the end of discharging the concrete into the cladding template, the integrated G layer production machine travels with it and begins its work. FIG. 2 shows the essential parts of this integrated machine. Funnel 215 receives a measured quota of aggregate mixture and controllably lets it down into snail conveyor 220 that travels the aggregates along to tablespoons conveyor 230. The aggregates are discharged into the conveyor that moves them into a cylindrical cartridge 260 (see FIG. 3), which is actually the hopper of the G mixture in machine 200. The width of the tablespoons conveyor and cartridge is the same as the width of the hopper 110E(top) (see also FIG. 1A) and cladding template 125, which results in even or random distribution of the aggregate mixture over the top concrete layer as the entire assembly of the integrated machine travels above the template together with the second basket that retreats to its starting point. Movement speed and vibration mode, as well as amount of bottom trough opening controls the G material flow and creates speed over the product.

Figure 6:
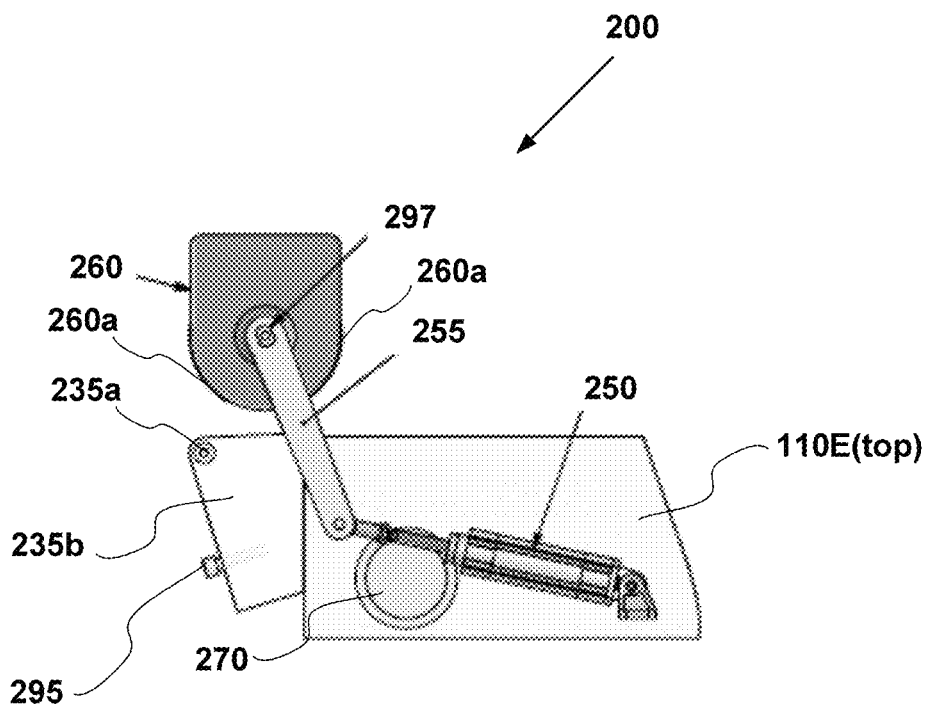
Figure 7:
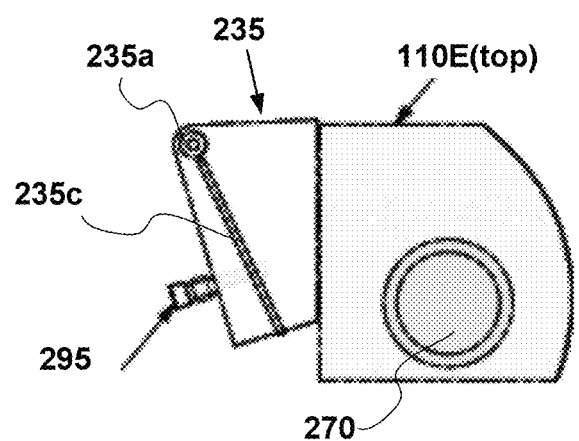

Motor 245 drives the tablespoons conveyor and cartridge above the cladding template in a horizontal direction relative to the template and in backwards movement relative to the starting point of the concrete hopper 100A. At the same time, motor 265 rotates the snail conveyor around its longitudinal axis to advance the aggregates, which are discharged from the funnel. The aggregates are discharged to the tablespoons conveyor and travel until they are discharged into the cylindrical cartridge. The cartridge is fixed in its place and does not rotate around its axis. FIG. 6 shows that the cartridge has a permanent top opening to receive the aggregates and a bottom door 260a opposite the top opening. The bottom door opens and closes with an assembly of a bearing 297, a lever 255 and a telescopic piston 250, which are attached together with hinges. The axial movement of the piston generates angular movement of the lever around the bearing. As a result, the cartridge's bottom door closes and opens, thus regulating the discharge of the aggregate of the G mixture to the trough volume. Screw 295 is used to set the distance of the back wall 235c of the trough 235 from the front wall (not shown). This sets the corresponding width of the trough and thereby its volume and capacity. Bar 235a acts as a hinge that attaches the back wall to the top edges of side walls 235b of the trough, such that it may swing towards the front wall and back. This in turn closes and opens the bottom opening of the trough as illustrated in a non-particular non-limiting example in FIG. 11 and in the description below. The trough 235 itself is attached to the side of hopper 110E(top) that discharges the cement of the top layer of the cladding, which enables it to move with hopper 110E (top) as it retreats to the starting point. The funnel, conveyors and cartridge, however, are fixed in place at the end point of track of hopper 110E (top), and do not travel with the trough and hopper. After being filled at the end point of the route of the hopper of the top layer of the cladding, the trough discharges the aggregate mixture off of its bottom opening onto the top surface of the cladding in cladding template 125 as the hopper travels back. The hopper itself travels above the cladding template with wheels 270 over rails 130 and carries the trough with it back and forth.

Figure 11:
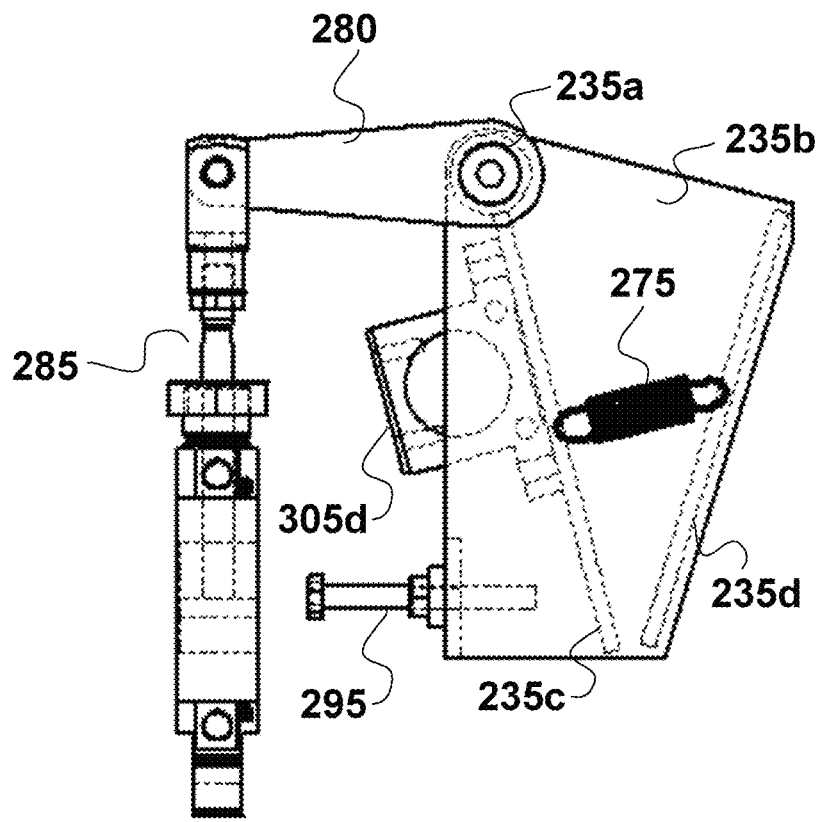
FIG. 11 illustrates a mechanism for controlling the release of the G-mixture over the top layer of the claddings in the integrated version of the machine in FIGS. 2-7.

FIG. 11 illustrates a particular embodiment of a mechanism for controlling the release of aggregates from the trough 235 to the top surface of the claddings. The main parts of this mechanism comprise a piston 285 and a lever 280, which is connected to rotatable bar 235*a*. Bar 235*a* serves as an axis for moving the back wall 235*c* of the trough forward towards front wall 235*d* and backwards to its initial position. With such movement, the lower opening of the trough is controlled to allow selected amounts of aggregates to be released on the top surface of the cladding. The piston 285 is connected to lever 280 with an axle so that axial movement of the piston 285 translates to radial movement of the lever 280. Simultaneously, the radial movement of the lever 280 pushes or pulls rotatable bar 235*a* that acts like a hinge, and this bar pushes or pulls the back wall 235*c* of the trough towards or away from front wall 235*d* to open or close its lower opening. A spring 275 is held between back and front walls, 235*c* and 235*d*, respectively, being in contact with the back wall on one end and front wall on its other end. This spring resists the operation of the piston 285 and lever 280 to push the back wall 235*c* towards front wall 235*d* and thus controls the distance that the back wall can travel towards the front wall and the width of the bottom opening. As a result, this mechanism also controls the quota of G-mixture that is discharged out of the trough on the top surface of the claddings. A vibrator 305*d* is placed in contact with the outer surface of back wall 235*c*. When the vibrator 305*d* operates, it vibrates the back wall 235*c* and in fact the entire trough 235 and mixes the G-mixture content in the volume of the trough 235. Thus it helps in regulating the amount of G-mixture that is let out of the bottom opening during motion of the trough above the claddings. Further, mixing the aggregates in the trough with this vibrator 305*d* produces a random distribution of the G-mixture on the top surface of the claddings. The intensity of vibration of the vibrator 305*d* determines the level of randomness of distribution of the aggregates on the cladding surface. It may, therefore, be controlled between none to produce even distribution, when the vibrator does not operate, to maximal according to its intensity of vibration to produce different levels of random distribution. In another aspect, the combined operation of the opening and closing mechanism of the bottom opening of the trough and the vibrator controls and determines the level of coverage of the top surface of the claddings with the G-mixture and the randomness of this coverage.

A consecutive cycle of loading and distributing aggregates follows as the trough completes a full back and forth travel with the hopper 110E (top) and returns to the hopper end point, where the refilled funnel loads it again. The aggregate distribution cycle is coordinated with the cycle of manufacturing the claddings, so that the two processes are synchronized with each other to ensure a continuous work flow of manufacturing multi-layer claddings with a decorative top G layer.

Figure 8A:
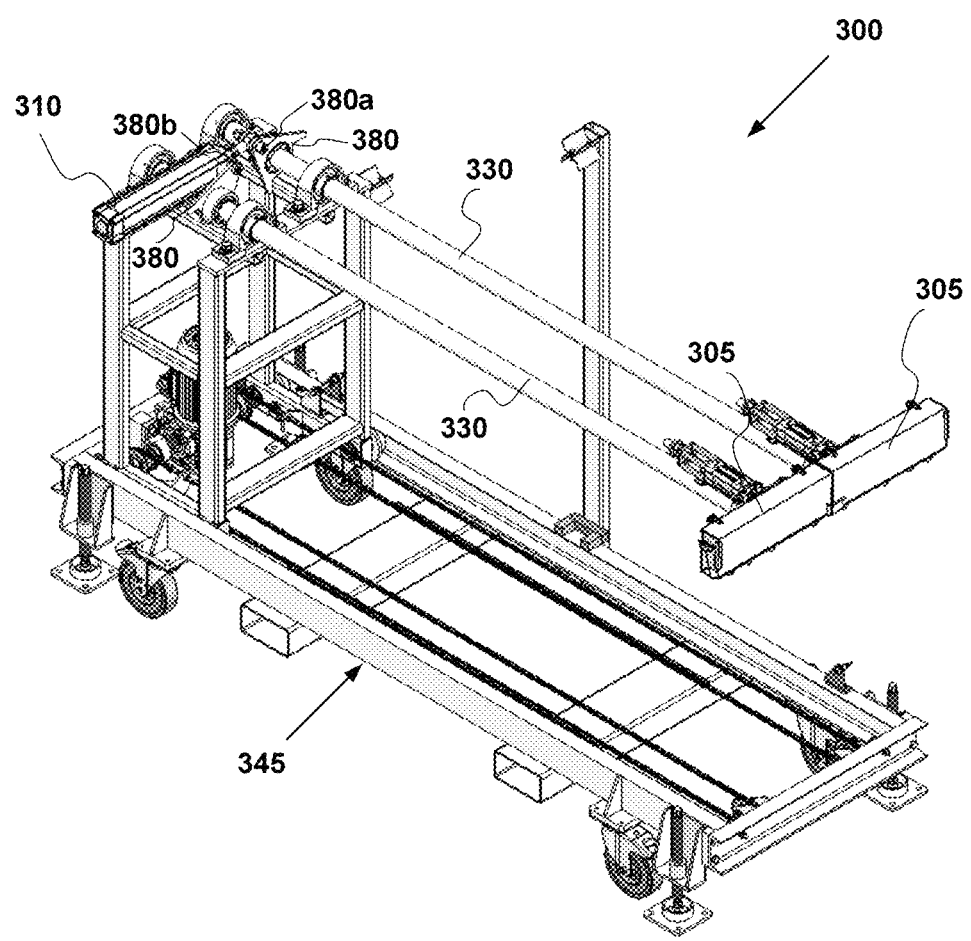
FIGS. 8A-E illustrate specific parts of the standalone machine for producing the G layer.
Figure 8B:
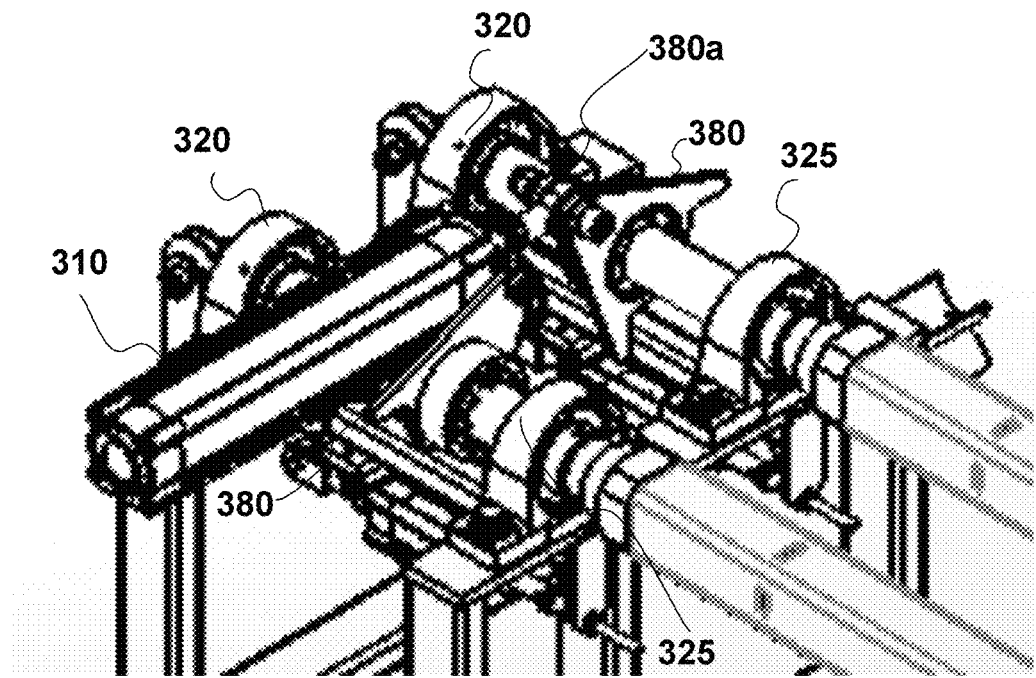

In another embodiment of the invention, FIGS. 8A-E through 10A-C illustrate a standalone version of the machine for producing the decorative G layer on the top surface of a cladding. The machine dynamically adapts itself to the dimensions of the entrance of the machine for manufacturing claddings, by alternating between charging and discharging positions of its aggregate discharging troughs 305. FIG. 8A illustrates schematics of the standalone machine 300. The machine essentially comprises the following three main parts: an assembly for alternating between positions of the troughs 305, a motor assembly 335 for travelling the troughs assembly in and out of the cladding manufacturing machine and the troughs themselves and a support frame 345 with rails for the motor assembly to travel over. The troughs assembly comprises a telescopic piston 310 that revolves two sets of bearings inside fixed rings 320, 325 (see FIG. 8B). Axles 380 are held each one at the proximal ends of arms 330 and connected to the piston 310 with axes 380*a* and 380*b*. Particularly, one axle is connected to the inner cylinder 335 (see FIG. 8C) of the piston with axis 380*a* and the second axle is connected to the outer cylinder of the piston 310 with axis 380*b*. The two axles are thus configured to rotate in opposite directions one relative to the other with the extension and retraction of the piston 310. Such relative counter-rotation of the axles generates a corresponding relative counter rotation of the two sets of bearings 320, 325 and thus of the arms 330, which are held within these bearings, and troughs 305 at the distal ends of the arms. This relative counter rotation causes the troughs to rotate 90° in opposite directions one relative to the other, so that they interface each other at their proximal ends in a horizontal position and separate from each other at their vertical position with their side openings 305*a* (see FIG. 8C) facing up at their distal ends. This enables charging the troughs with an aggregate mixture through their side openings 305*a* in vertical position and discharge the mixture through their side door 305*b* in horizontal position.

The transition from vertical to horizontal position also allows the cooperation of the cladding manufacturing machine 100 with the G layer production machine 300. Thus the two arms move together, and their relative opposite radial movement alternates the troughs between charging and discharging positions, see FIGS. 8A and 8D. In its extended state, the piston 310 moves the axles away from each other, and the two sets of bearings rotate in opposite directions relative each other. The sets of bearings cause the arms also to rotate in opposite directions and rotate the troughs 90° in opposite directions to vertical position, see FIG. 8C. Thus the retraction and extension of the piston 310 enables simultaneous movement of the troughs for filling them with a quota of aggregates in charging vertical position and discharging the aggregates on the cladding surface in their discharging horizontal position inside the cladding manufacturing machine. Side opening 305*b* of the troughs opens for discharging the aggregates on the claddings surface in the manufacturing process. The top openings 305*a* of the troughs are left open after charging with the aggregate mixture. The mixture itself does not spill out of these top openings 305*a* as the troughs rotate to horizontal position, because their top openings 305*a* interface each other and make a continuous closed volume that prevents such spilling. At the bottom base opposite the top base of the troughs is a door 305*a*1 that is kept shut with a spring 305*a*2. This bottom door is used for cleaning the interior of the troughs from accumulated residues of cement and additives that the aggregate mixture contains. The spring 305*a*2 is manually released to open the bottom side door 305*a*1 for cleaning the troughs.

Figure 8C:
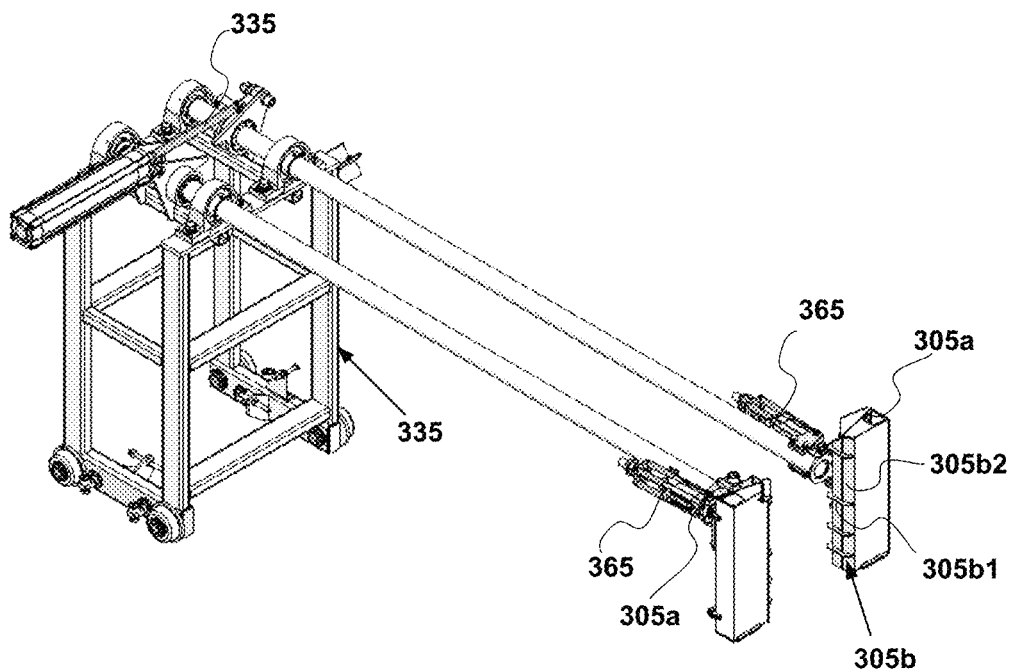
Figure 8D:
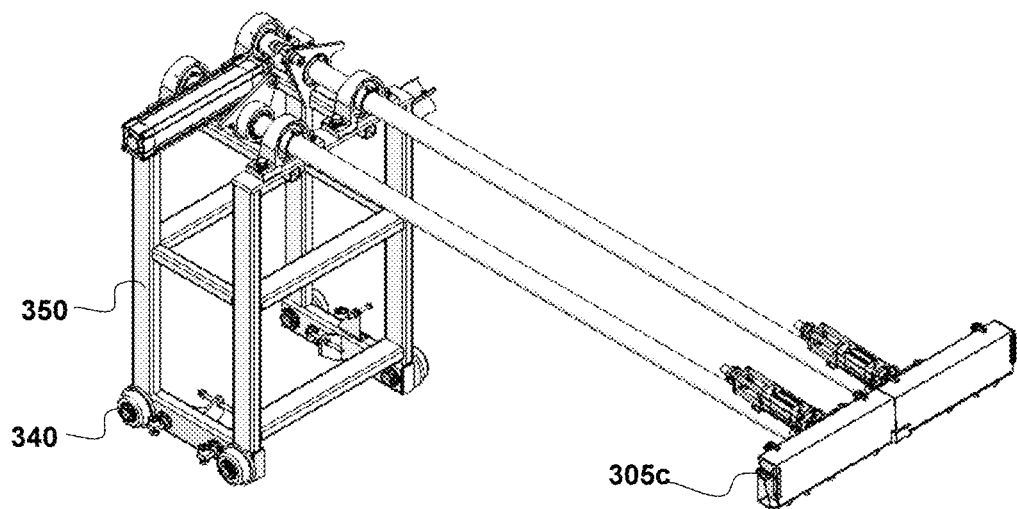
Figure 8E:
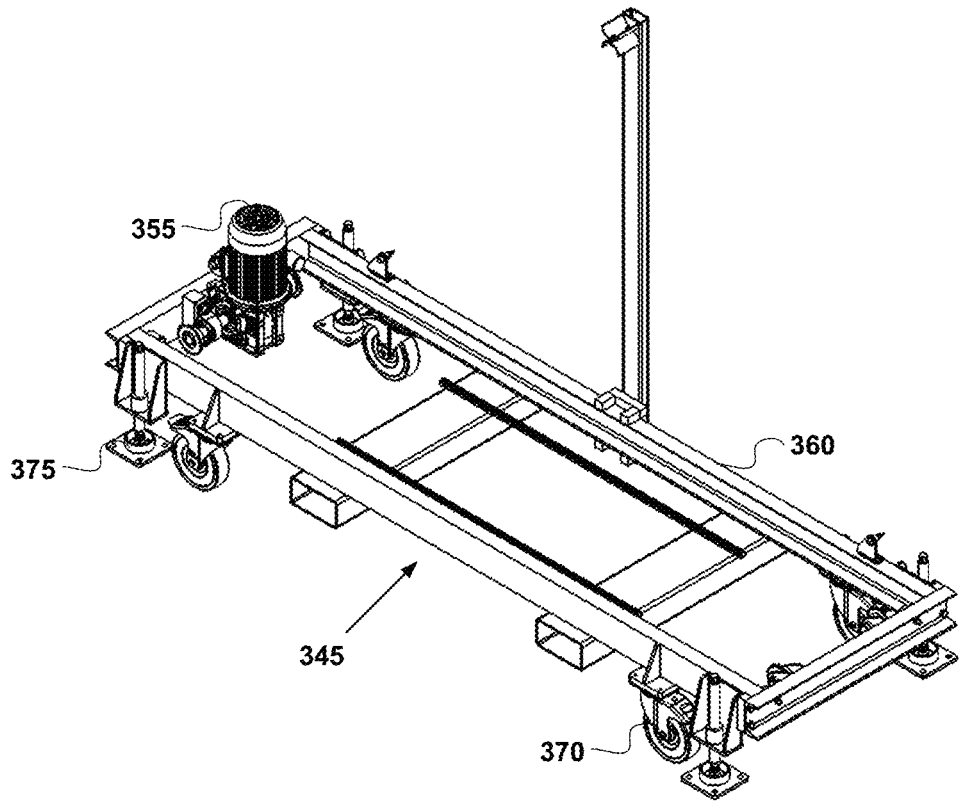

FIG. 8C exemplifies how air pressure pistons 365, attached to the distal ends of the arms 310, push to expose the side opening of the trough 305 in the following way.

Figure 9A:
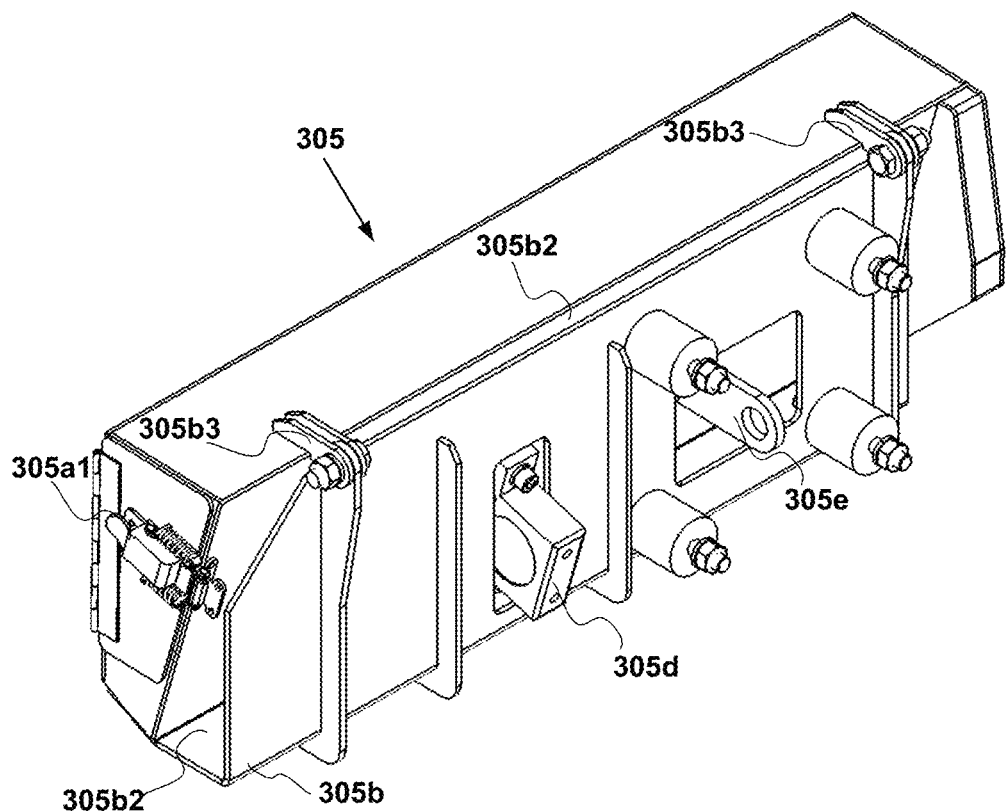
FIGS. 9A-C illustrate specific parts in the trough of the standalone version of the machine for producing the G layer.
Figure 9B:
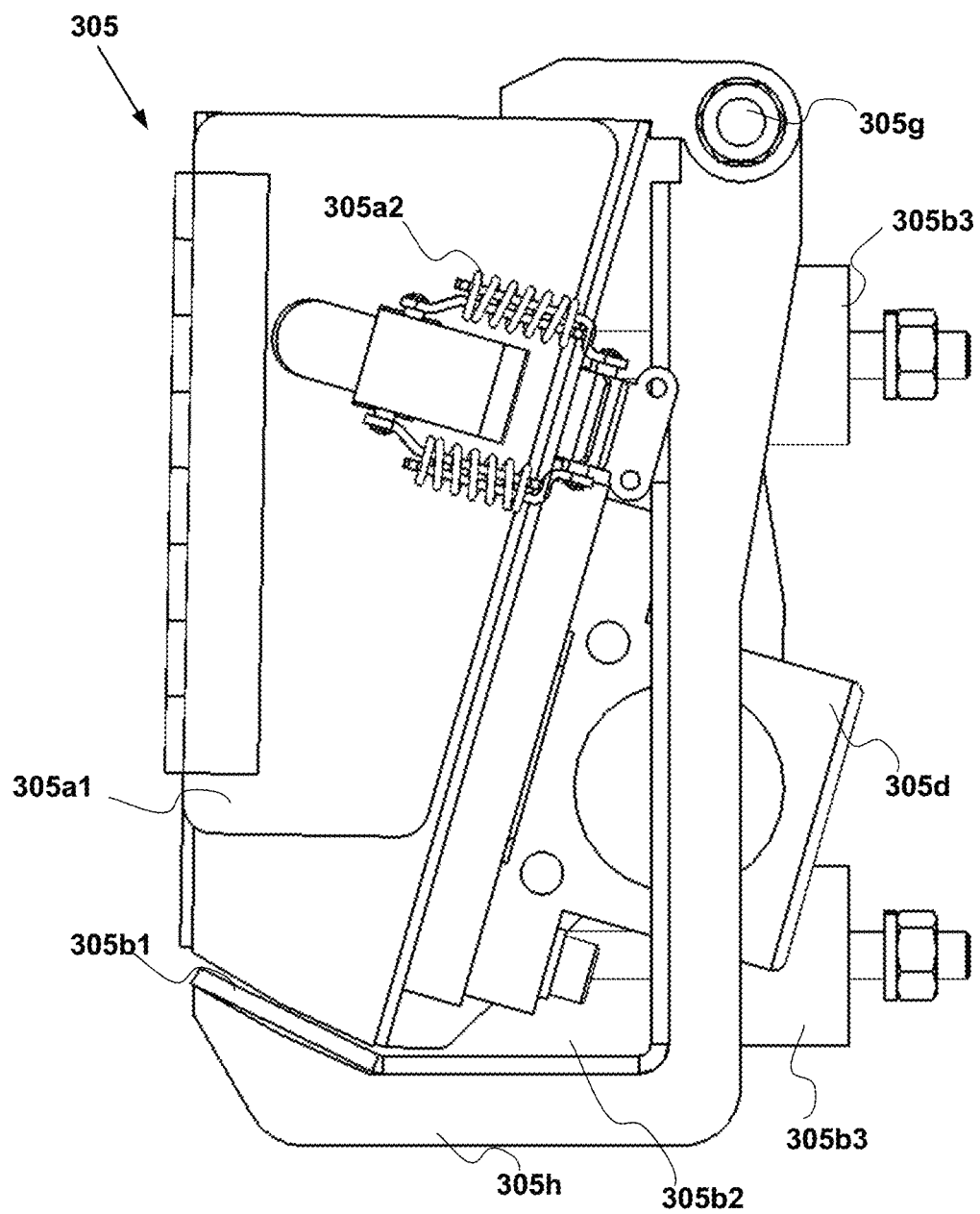
Figure 9C:
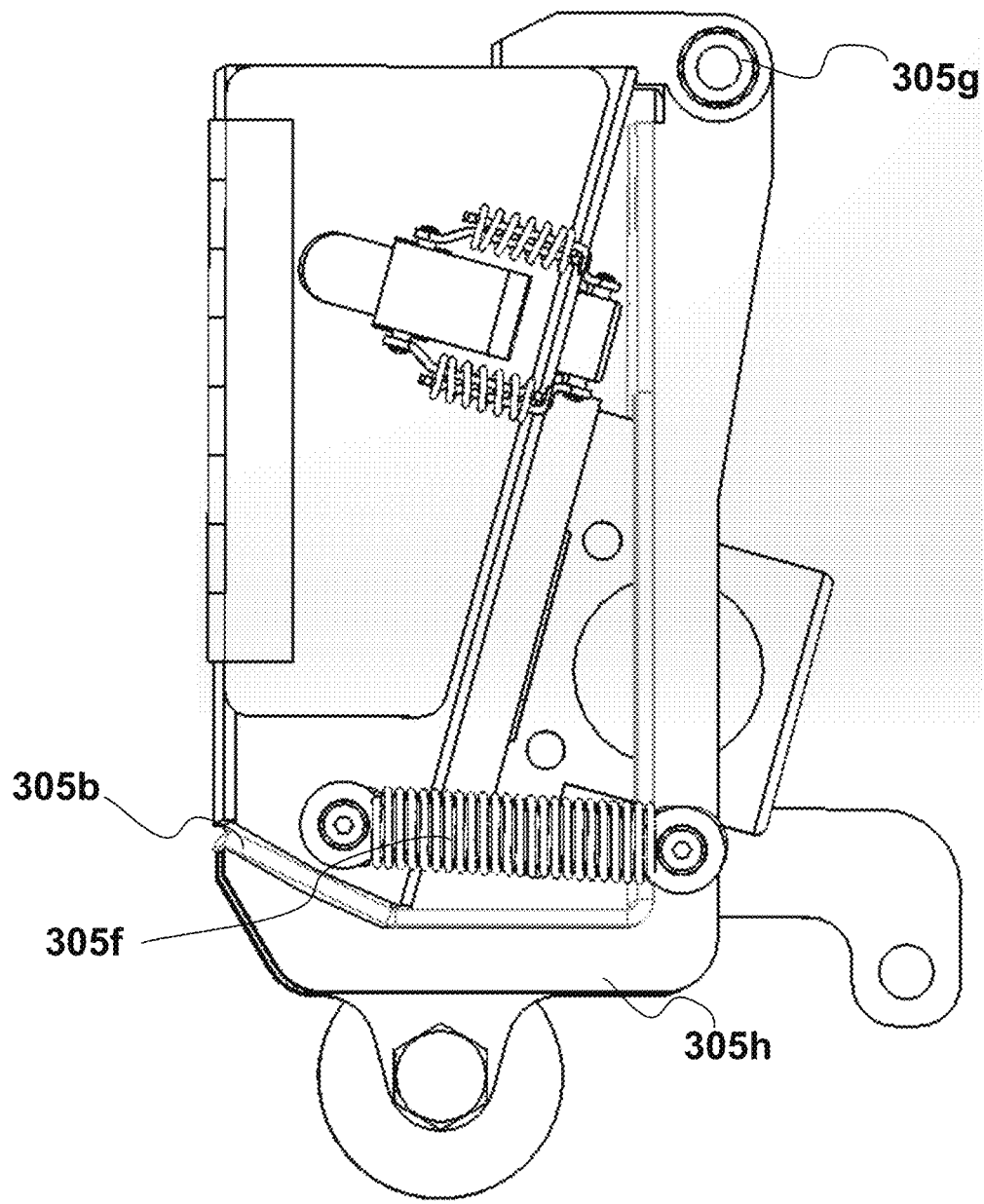

Pistons 365 push stick 305*e* (see FIG. 9A) that goes through fixed jaw 305*h* and L-shape side door 305*b*. The stick 305*e* pushes the trough 305 away from fixed jaw 305*h* and door 305*b* as the trough 305 rotates around axis 305*g*. As a result, the side opening of the trough 305 is exposed relative to horizontal bottom part 305*b*2 and distal inclined part 305*b*1 of the side door 305*b*. The opening of the trough at its side enables to discharge the aggregate mixture on the top surface of the claddings. The pistons 365 and stick 305*e* control the distancing of the trough 305 from the side door 305*b*. Therefore, they also control the width of the side opening through which the G-mixture is discharged and as a result the degree of coverage of the top surface of the claddings with the G-mixture. Vibrator 305*d*, which is introduced through jaw 305*h* and door 305*b*, vibrates the back wall of the trough 305 and as result the G-mixture inside the volume of the trough. This way the vibrator 305*d* advances discharging of the G-mixture and even or random distribution of the aggregates on the top surface of the claddings. The intensity of vibration is also controlled, which enables to set vibrator 305*d* in a certain vibration mode and frequency and thus the level of mixing the G-mixture inside the trough and the level of randomness of its distribution on the top surface of the claddings. The combination of the pistons 365 and stick 305*e* with the vibrator 305*d* provides control over the two parameters, the width of the side opening and the intensity of vibration of the trough, so that the level of coverage and randomness of distribution of the G-mixture on the top surface of the claddings are also controlled. The troughs discharge the aggregate quota in controllable amounts and level of distribution on the top surface of the cladding as they move from the starting point inside the cladding machine to the entrance point. In one particular example, fixed spring 305*f* attaches the back to the top base of the troughs and pulls them together against the push action of pistons 365 on pushing stick 305*e*. Specifically, the spring connects the jaw 305*h* to the top base, where the jaw wraps the back and side of the troughs. The push action by pistons 365 and pushing stick 305*e* is done against the hook force of the spring 305*f* that keeps the back and top base in closed state and forces the spring to stretch and release the gap that opens between side opening of the trough 305 and side door 305*b* for discharge. As the pistons stop, the pushing stick 305*e* retreats, the spring 305*f* returns to relaxed state and the gap is closed. The gap opens as the trough is pushed away from the jaw 305*h* and side door 305*b* in the horizontal position of the troughs. A plurality of ribs 305*b*3 is fixed along the length of side door 305*b* and transversely stretches over the side door. The ribs provide additional external reinforcement to the side door 305*b* in its fixed position.

Motor assembly 335 comprises a motor 355, a skeleton 350 and wheels 340 for travelling the troughs into and out of the cladding manufacturing machine. To ensure linear backward and forward motion, the motor assembly travels over a rail 360 on a horizontal support frame 345. The support frame is positioned a selected distance from the cladding manufacturing machine and may lock in place with stopper legs 375 to ensure stability of the machine, particularly the motor and troughs assemblies on the rails and position relative to the entrance of the cladding manufacturing machine. The support frame is equipped with hinged wheels 370 for repositioning the support frame relative to the entrance to the cladding manufacturing machine and essentially the machine for generating the G layer.

FIGS. 10A-C illustrate the combination of the standalone machine for producing the G layer 300 and the manufacturing cladding machine 100. FIG. 10A shows the G layer production machine in pre-entrance state. In particular, arms 330 are in extended state, which brings the troughs 305 to the entrance of the cladding machine in charging, vertical position. This enables the troughs to enter into and exit the cladding machine through a relatively small opening and deploy to a working, operative horizontal position only when inside. FIG. 10B exemplifies the initial stage of the introduction of the troughs into the cladding machine, where the troughs are in the middle of rotating from vertical charging position to horizontal discharging and operative position. This deployment will reach its final state when the arms push the troughs to their starting point above the distal edge of the cladding template 125 as shown in FIG. 10C. FIG. 10C also shows the relative position of the motor assembly on the support frame 345. After contacting the entrance of the cladding manufacturing machine, the motor assembly travels on the rails of the support frame, thereby introducing the arms and troughs into the cladding machine. The motor itself remains fixed at the proximal end of the support frame 345 and does not travel with the skeleton 350. The troughs assembly makes a reverse movement by gradually retracting to its initial position at the initial proximal end of the frame. At the same time the troughs release the aggregates of the G layer on the top surface of the claddings. When reaching the proximal end of the template and completing the discharging of the G-mixture, the troughs are turned clockwise and counter-clockwise relative each other to their charging vertical position and are let out of the cladding machine for charging for another cycle.

A controller in the motor assembly controls these actions and ensures that they are carried in a preset time frame, at predetermined time intervals between actions and in synchronized and coordinated manner. This provides an efficient and fluent operation of the standalone G layer producing machine, which is timed and coordinated with the operation of the cladding manufacturing machine.

The invention claimed is:

1. A decorative aggregate G-layer production machine for overlaying a G-layer on top surface of claddings, said machine comprising:
   a funnel for receiving a quota of a G-mixture;
   a snail conveyor in communication with said funnel for receiving and transporting said G-mixture;
   a spoon conveyor in communication with said snail conveyor for receiving and transporting said G-mixture;
   a cylindrical cartridge in communication with said spoon conveyor for receiving said G-mixture; and
   a trough in communication with said cylindrical cartridge for receiving a selected amount of said G-mixture and discharging said G-mixture off on said top surface of said claddings.

2. The machine according to claim 1, further comprising a motor for travelling said G-mixture in said snail conveyor and a motor for travelling said G-mixture in said spoon conveyor.

3. The machine according to claim 1, wherein said cylindrical cartridge is in fixed position and comprising a permanently open top opening for receiving said G-mixture from said spoon conveyor and bottom shutters for discharging said G-mixture into said trough, wherein said cylindrical cartridge comprises an assembly for opening and closing said bottom shutters, said assembly comprising a bearing, a lever and a telescopic piston, attached together with hinges, said assembly is configured to translate axial retraction and expansion of said telescopic piston to radial movement of said lever and bearing for opening and closing said bottom shutters.

4. The machine according to claim 1, wherein said trough comprises a back wall connected to side walls with a top bar, said trough is attached to a basket of a multi-layer cladding manufacturing machine for discharging cement of said top surface of said claddings, a piston, a lever and a spring, wherein said piston is connected to said lever with a hinge, said lever is connected to said top bar, said top bar hingely attaches said back wall to said side walls and to said lever, and said spring is in contact with said back wall on its one end and a front wall of said trough on its other end, wherein said piston, lever and spring are configured to open and close bottom opening of said trough and width between said back and side walls, wherein said width controls and determines a quota of said G-mixture that is discharged out of said trough and level of coverage of said top surface of said claddings with said G-mixture, wherein said trough further comprises a screw, said screw is configured to set a distance of said back wall of said trough from said front wall of said trough and corresponding volume of said trough for accommodating said quota of said G-mixture.

5. The machine according to claim 4, further comprising a vibrator in contact with said back wall, said vibrator is configured to vibrate said trough and accordingly said G-mixture inside volume of said trough, wherein intensity of vibration of said vibrator controls and determines level of randomness of said G-mixture on said top surface of said claddings.

6. The machine according to claim 1, wherein said G-layer production machine is integrated into a multi-layer cladding manufacturing machine, wherein said funnel, snail conveyor, spoon conveyor and cylindrical cartridge are fixedly attached to a cladding concrete hopper containing concrete of a top layer of said claddings inside said multi-layer cladding manufacturing machine, said trough is attached to a moving basket for discharging said concrete of said top layer into said cladding template, said G-layer production machine is configured to travel with said basket and discharge said G-mixture on said top surface of said claddings, wherein said G-layer production machine is configured to initiate a cycle of production of said G-layer upon termination of manufacturing of said top layer of said claddings.

7. The machine according to claim 6, wherein operation of said G-layer production machine is synchronized with operation of said multi-layer cladding manufacturing machine, wherein discharging of said G-mixture by said G-layer production machine initiates at the end of overlaying said top layer of said claddings in said multi-layer cladding manufacturing machine, wherein discharging said G-mixture on top surface of said top layer of said claddings is synchronized with travelling of said concrete basket back to a starting point, wherein discharging said G-mixture off of said funnel, travelling said G-mixture by said snail conveyor to said spoon conveyor, releasing said G-mixture into said cylindrical cartridge and unloading it into said trough is synchronized with travelling of said concrete basket towards an end point and back to said starting point.

8. A decorative aggregate G-layer production machine for overlaying said G-layer on top surface of claddings, said machine comprising:
a troughs assembly for alternating between positions of troughs for charging an aggregate mixture and discharging it on said top surface of said claddings;
a motor assembly for travelling said troughs assembly; and
a support frame for supporting and travelling said motor assembly and said troughs assembly on a rail,
wherein said trough assembly comprises:
a pair of troughs comprising a top opening for charging aggregates into said troughs;
a pair of arms to which said pair of troughs are attached at distal ends of said arms;
two sets of bearings at proximal end of said arms;
a telescopic piston attached to said sets of bearings;
two axles, where one axle is attached to outer cylinder of said telescopic piston and a second axle is attached to inner cylinder of said telescopic piston, wherein said axles are attached to said cylinders with corresponding axes,
wherein said axles are configured to rotate in opposite directions relative each other, wherein opposite relative movement of said axles rotates said sets of bearings, arms and troughs in opposite directions relative each other and move said troughs between vertical charging state position and horizontal discharging state position.

9. The machine according to claim 8, wherein said troughs comprise a door at bottom base of said troughs opposite a top opening, said door is closed with a spring attached to said door for shutting it, wherein opening said door is used to clean inner walls of said troughs from residues of said aggregate mixture.

10. The machine according to claim 8, wherein said troughs comprise a side opening for discharging said aggregate mixture on said top surface of said claddings, said side opening comprises:
a L-shape side door extending along side and back of said troughs;
a jaw wrapping said side door of said troughs, said jaw is fixed in place;
an axis at top end of said jaw, said axis is in hinge communication with said trough;
a pushing stick inserted through said jaw and side door and in contact with back wall of said trough; and
pistons at distal ends of arms,
wherein each one of said pistons is configured to contact said pushing stick and push it against said back wall of said trough away from said side door and open a gap for discharging a G-mixture in horizontal position of said troughs, wherein said piston and pushing stick control width of said gap and quota of said G-mixture that is discharged out of said trough on said top surface of said claddings.

11. The machine according to claim 10, further comprising a spring extending from said back wall of said trough to top base of said troughs, said spring connecting said trough to said jaw, wherein strength of said spring resists pushing of said trough by said pushing stick and controls width of said gap and quota of said G-mixture that is discharged out of said trough on said top surface of said claddings.

12. The machine according to claim 8, further comprising a vibrator in contact with back wall of said trough and configured for vibrating said trough and mix said G-mixture within said trough during discharging of a G-mixture.

13. The machine according to claim 10, further comprising a plurality of ribs transversely extending above said side door and distributed along length of said side door, said ribs are configured to hold said side door in fixed position relative to said trough.

14. The machine according to claim 8, wherein said motor assembly comprises:

a motor; and a skeleton for mounting said troughs, wherein said motor provides power to travel said skeleton and troughs into and out of a cladding manufacturing machine, and wherein said motor is fixed in place at proximal edge of a support frame.

15. The machine according to claim 14, wherein said support frame comprises:

rails for travelling and wheels for orienting said machine in position relative opening of said cladding manufacturing machine;

a frame and rail for placing and travelling over said skeleton and troughs;

hinged wheels for repositioning said support frame relative to entrance of said cladding manufacturing machine; and stopper legs for ensuring stability of said machine in position relative to said entrance of said cladding manufacturing machine.

16. The machine according to claim 15, wherein said support frame further comprises stoppers for fixing said machine in said position.

17. The machine according to claim 8, further comprising a controller for controlling travelling of said motor assembly, rotation of sets of wheels, arms and troughs, retraction and expansion of a telescopic piston, retraction and expansion of air pressure pistons and vibration of a vibrator.

18. The machine according to claim 17, wherein said controller is configured to carry out activities in a preset time frame, at predetermined time intervals between said activities and in synchronized and coordinated manner, wherein said activities comprise travelling of said motor assembly, rotation of said sets of wheels, arms and troughs, retraction and expansion of said telescopic piston, retraction and expansion of said air pressure pistons and vibration of said vibrator.

19. The machine according to claim 8, wherein said machine is a standalone decorative aggregate G-layer production machine which is configured to overlay an aggregate G-layer on said top surface of said claddings inside a cladding manufacturing machine in fluent, timed and coordinated operation.

* * * * *